US009126545B2

(12) United States Patent
Ampunan et al.

(10) Patent No.: US 9,126,545 B2
(45) Date of Patent: Sep. 8, 2015

(54) VEHICLE SYSTEMS ACTIVATION METHODS AND APPLICATIONS

(75) Inventors: Nathan D. Ampunan, Novi, MI (US); Richard H. Lieblein, Lake Orion, MI (US); Christopher T. Thibodeau, Plymouth, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 174 days.

(21) Appl. No.: 13/035,296

(22) Filed: Feb. 25, 2011

(65) Prior Publication Data

US 2012/0221173 A1    Aug. 30, 2012

(51) Int. Cl.
*G06F 17/00* (2006.01)
*B60R 16/037* (2006.01)
*H04W 4/00* (2009.01)
*H04W 4/04* (2009.01)

(52) U.S. Cl.
CPC ............ *B60R 16/037* (2013.01); *H04W 4/001* (2013.01); *H04W 4/046* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,429,773 | B1 * | 8/2002 | Schuyler | 340/425.5 |
| 6,728,612 | B1 * | 4/2004 | Carver et al. | 701/34.3 |
| 7,043,357 | B1 * | 5/2006 | Stankoulov et al. | 701/446 |
| 7,124,027 | B1 * | 10/2006 | Ernst et al. | 701/301 |
| 7,209,813 | B2 | 4/2007 | Namaky | |
| 7,327,280 | B2 * | 2/2008 | Bachelder et al. | 340/906 |
| 7,558,564 | B2 * | 7/2009 | Wesby | 455/419 |
| 7,590,489 | B2 * | 9/2009 | Auger et al. | 701/420 |
| 7,629,924 | B2 * | 12/2009 | Huang et al. | 342/357.62 |
| 7,961,076 | B2 * | 6/2011 | Kelley et al. | 340/5.52 |
| 8,290,665 | B2 * | 10/2012 | Placke et al. | 701/43 |
| 8,326,259 | B2 * | 12/2012 | Gautama et al. | 455/404.1 |
| 8,335,502 | B2 * | 12/2012 | Oesterling et al. | 455/419 |
| 8,457,686 | B2 * | 6/2013 | Przybylski | 455/556.1 |
| 2002/0005802 | A1 * | 1/2002 | Bryant et al. | 342/357.01 |
| 2002/0032853 | A1 * | 3/2002 | Preston et al. | 713/151 |
| 2002/0053985 | A1 * | 5/2002 | Nesbitt | 340/994 |
| 2002/0113686 | A1 | 8/2002 | Carravallah | |
| 2002/0173348 | A1 * | 11/2002 | Chen | 455/569 |
| 2002/0177448 | A1 * | 11/2002 | Moran et al. | 455/456 |
| 2003/0073406 | A1 * | 4/2003 | Benjamin et al. | 455/41 |
| 2004/0203850 | A1 * | 10/2004 | Oesterling | 455/456.1 |
| 2005/0136978 | A1 * | 6/2005 | Kamdar et al. | 455/558 |
| 2005/0203677 | A1 * | 9/2005 | Auger et al. | 701/16 |
| 2005/0222933 | A1 * | 10/2005 | Wesby | 705/36 |
| 2006/0250965 | A1 * | 11/2006 | Irwin | 370/238 |

(Continued)

FOREIGN PATENT DOCUMENTS

| | | |
|---|---|---|
| CN | 1783161 A | 6/2006 |
| CN | 101280651 A | 10/2008 |
| WO | 2010021426 A1 | 2/2010 |

OTHER PUBLICATIONS

Chinese Office Action for Application No. 201210043352.6 dated Feb. 27, 2014; 10 pages.

*Primary Examiner* — Jonathan L Sample

(74) *Attorney, Agent, or Firm* — Cantor Colburn LLP

(57) ABSTRACT

A method of communicating with a vehicle is provided. The method includes: initiating a communication with a vehicle activation application of a vehicle using a personal handheld device; authenticating, using a processor, the personal handheld device based on the communication; and selectively activating one or more components of a vehicle network based on the authenticating.

18 Claims, 3 Drawing Sheets

(56) References Cited

U.S. PATENT DOCUMENTS

| | | | |
|---|---|---|---|
| 2006/0255908 A1* | 11/2006 | Gilbert et al. | 340/5.61 |
| 2007/0066276 A1* | 3/2007 | Kuz et al. | 455/404.1 |
| 2007/0082689 A1* | 4/2007 | Talty et al. | 455/518 |
| 2007/0118286 A1* | 5/2007 | Wang et al. | 701/213 |
| 2007/0152877 A1* | 7/2007 | Madhaven et al. | 342/357.02 |
| 2007/0197261 A1* | 8/2007 | Humbel | 455/558 |
| 2007/0230413 A1* | 10/2007 | Gandhi et al. | 370/338 |
| 2008/0046135 A1* | 2/2008 | Farrow | 701/2 |
| 2008/0057868 A1* | 3/2008 | Chang | 455/41.2 |
| 2008/0057929 A1 | 3/2008 | Min | |
| 2008/0065293 A1* | 3/2008 | Placke et al. | 701/41 |
| 2008/0091717 A1* | 4/2008 | Garbow et al. | 707/104.1 |
| 2008/0139196 A1* | 6/2008 | Zhang et al. | 455/423 |
| 2008/0246586 A1* | 10/2008 | Hiramine | 340/5.72 |
| 2008/0319602 A1* | 12/2008 | McClellan et al. | 701/33 |
| 2010/0023265 A1* | 1/2010 | Huang et al. | 702/1 |
| 2010/0211440 A1* | 8/2010 | Leshem | 705/13 |
| 2010/0228404 A1* | 9/2010 | Link et al. | 701/1 |
| 2010/0235891 A1* | 9/2010 | Oglesbee et al. | 726/5 |
| 2010/0328461 A1* | 12/2010 | Renkis | 348/143 |
| 2011/0009107 A1* | 1/2011 | Guba et al. | 455/418 |
| 2011/0054767 A1* | 3/2011 | Schafer et al. | 701/119 |
| 2011/0063138 A1* | 3/2011 | Berkobin et al. | 340/988 |
| 2011/0080300 A1* | 4/2011 | Bequette et al. | 340/686.6 |
| 2011/0093846 A1* | 4/2011 | Moinzadeh et al. | 717/178 |
| 2011/0117845 A1* | 5/2011 | Kirsch et al. | 455/41.2 |
| 2011/0143750 A1* | 6/2011 | Farrell et al. | 455/426.1 |
| 2011/0215899 A1* | 9/2011 | Van Wiemeersch et al. | 340/5.24 |
| 2011/0215901 A1* | 9/2011 | Van Wiemeersch et al. | 340/5.54 |
| 2011/0224870 A1* | 9/2011 | Tan | 701/36 |
| 2011/0312273 A1* | 12/2011 | Harris | 455/41.2 |
| 2012/0095642 A1* | 4/2012 | Nishida | 701/31.4 |
| 2012/0142367 A1* | 6/2012 | Przybylski | 455/456.1 |
| 2012/0157083 A1* | 6/2012 | Otterson | 455/422.1 |
| 2012/0172012 A1* | 7/2012 | Sumcad et al. | 455/414.1 |

* cited by examiner

VEHICLE SYSTEMS ACTIVATION METHODS AND APPLICATIONS

FIELD OF THE INVENTION

Exemplary embodiments of the invention are related to systems and methods for remotely communicating with a network of a vehicle.

BACKGROUND

A vehicle typically includes a plurality of controllers and devices. The controllers and devices communicate with each other using a vehicle on-board communication network. Such networks can include, for example, a vehicle bus that communicates according to a plurality of communication protocols such as a combination of a high speed controller area network (CAN) bus, and a low speed CAN bus. Accordingly, it is desirable to provide connectivity methods and systems to communicate with the on-board communication network.

SUMMARY OF THE INVENTION

A method of communicating with a vehicle is provided. The method includes: initiating a communication with a vehicle activation application of a vehicle using a personal handheld device; authenticating, using a processor, the personal handheld device based on the communication; and selectively activating one or more components of a vehicle network based on the authenticating.

The above features and advantages and other features and advantages of the invention are readily apparent from the following detailed description of the invention when taken in connection with the accompanying drawings.

BRIEF DESCRIPTION OF THE DRAWINGS

Other objects, features, advantages and details appear, by way of example only, in the following detailed description of embodiments, the detailed description referring to the drawings in which.

DESCRIPTION OF THE EMBODIMENTS

Figure 1:
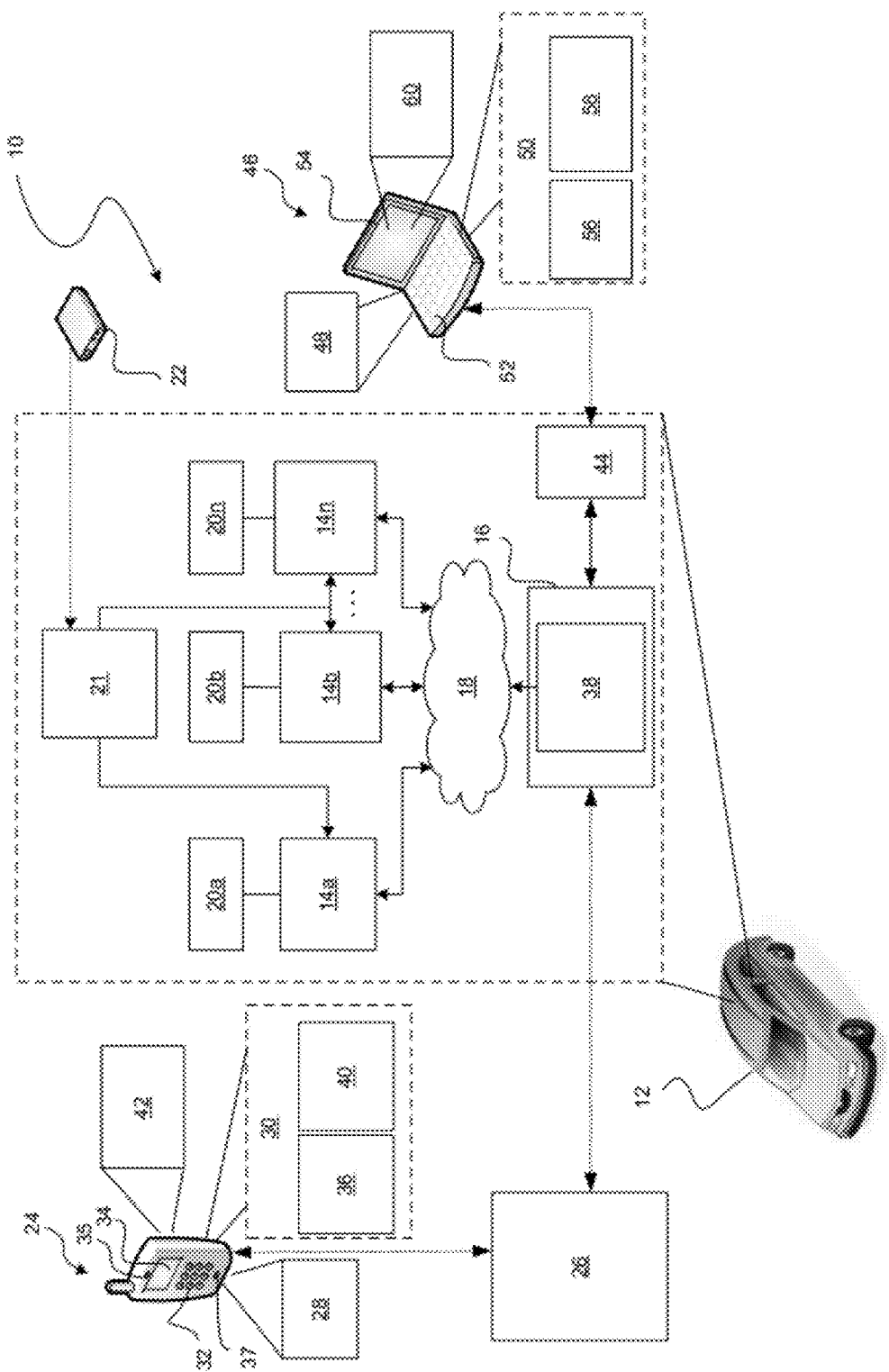
FIG. 1 is a functional block diagram of an activation system that includes a vehicle that communicates with various remote devices via an activation application in accordance with exemplary embodiments.

The following description is merely exemplary in nature and is not intended to limit the present disclosure, its application or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, one or more software or firmware programs, a combinational logic circuit, and/or other suitable components that provide the described functionality.

In accordance with various embodiments of the present disclosure, an activation system of a vehicle 12 is shown generally at 10. The vehicle 12 includes one or more control modules and/or devices 14a-14n that communicate with each other and a telematic system 16 via a vehicle network 18. The control modules and/or devices 14a-14n control one or more vehicle systems 20a-20n and can include, for example, but are not limited to, an engine control module, a transmission control module, a body control module, and other electronic modules or devices resident within the vehicle 12.

In various embodiments, one or more of the control modules and/or devices 14a-14n communicates with a presence indication system 21. The presence indication system 21 detects the presence of a portable device 22 (e.g., a FOB). For example, the presence indication system 21 can include a receiver (not shown) that receives signals from the portable device 22 when the portable device 22 is in proximity to the vehicle 12. The presence indication system 21 recognizes the signals and generates a presence signal on the vehicle network 18 or directly to one or more of the controls modules and/or devices 14a-14n based thereon.

As can be appreciated, the vehicle network 18 can include any combination of wired or wireless communication channels. For example, the vehicle network 18 can include a single communication bus or a combination of various communication buses that are implemented according to vehicle communication network standards, such as, for example, Controller Area Network (CAN), Society of Automotive Engineers (SAE) J1850, and General Motors Local Area Network (GM-LAN), etc.

The telematics system 16 further communicates with a personal handheld device 24 via one or more communication mediums 26 (e.g., a satellite, a tower, etc.). As can be appreciated, the personal handheld device 22 can be any device that includes a processor and memory. For example, such personal handheld device 22 can be, but is not limited to, a smart phone, a portable computing device, or other electronic handheld devices.

In the example of FIG. 1, the personal handheld device 22 is configured to include, a processor 28, a storage medium 30, one or more input devices 32, a display 34 a speaker 35, a microphone 37, and a network interface 36. The personal handheld device 24 communicates with the telematics system 16 via the network interface 36 and using a network protocol that is applicable to the personal handheld device 24 (e.g., a telecommunications protocol, such as, GSM, CDMA, 3G, HSPA+, 4G, LTE, etc., an wireless protocol, such as, Wi-Fi, BlueTooth, etc.).

The personal handheld device 22 and/or the telematics system 16 can be configured to include one or more activation applications. The activation applications include one or more software instructions that, when executed by a processor, allow a user to communicate with the vehicle 12 to remotely activate the vehicle network 18. As can be appreciated, the activation applications can be implemented solely on the vehicle 12, can be implemented partly on the personal handheld device 24 and partly on the vehicle 12, or can be implemented solely on the personal handheld device 24. As can further be appreciated, the activation application can be implemented as a single application or as part of other software.

In the exemplary embodiments of FIG. 1, a vehicle activation application 38 is shown to be a part of or communicate with the telematics system 16 and can receive signals generated by the personal handheld device 24. A device activation application 40 is shown to be stored to the storage medium 30 (i.e. downloaded from a central server) of the personal handheld device 24 and can generate the signals to communicate directly or indirectly with the vehicle activation application 38. In various embodiments, the device activation application 40 manages an application user interface 42 that may be displayed by the display 34 of the portable handheld device 24.

In various embodiments, the vehicle 12 may further include a communication port 44 that provides a direct data link to the vehicle network 18. For example, a connectivity device (not shown) may couple a computing device 46 to the communications port 44 (e.g., an assembly line diagnostic link (ALDL) port) thus, providing the computing device 46 access to the control modules and/or devices 14a-14n and the telematics system 16 of the vehicle 12. In another example, the communication port 44 is a short range wireless communication port (e.g., BlueTooth) and/or a long range wireless communication port (e.g., Wi-Fi) that provides the computing device 46 access to the control modules and/or device 14a-14n and the telematics system 16 of the vehicle 12.

As can be appreciated, the computing device 46 can be any computing device that includes a processor and memory. For example, such computing device 46 can include, but is not limited to, a laptop, a technician tool, or other portable handheld device that communicates with a vehicle network. In the example of FIG. 1, the computing device 46 is a computer that is configured to include, a processor 48, a storage medium 50, one or more input devices 52, a display 54, and a network interface 56. The computing device 46 communicates with the communications port 44 via the network interface 56 and using the network protocol that is applicable to the computing device 46.

The computing device 46 is further configured to include one or more vehicle configuration applications 58. The vehicle configuration application 58 includes one or more software instructions that, when executed by the processor 48, allow a user to configure activation settings of the activation applications 38, 40. In various embodiments, the vehicle configuration application 58 manages an application user interface 60 that may be displayed by the display 54 of the computing device 46.

Figure 2:
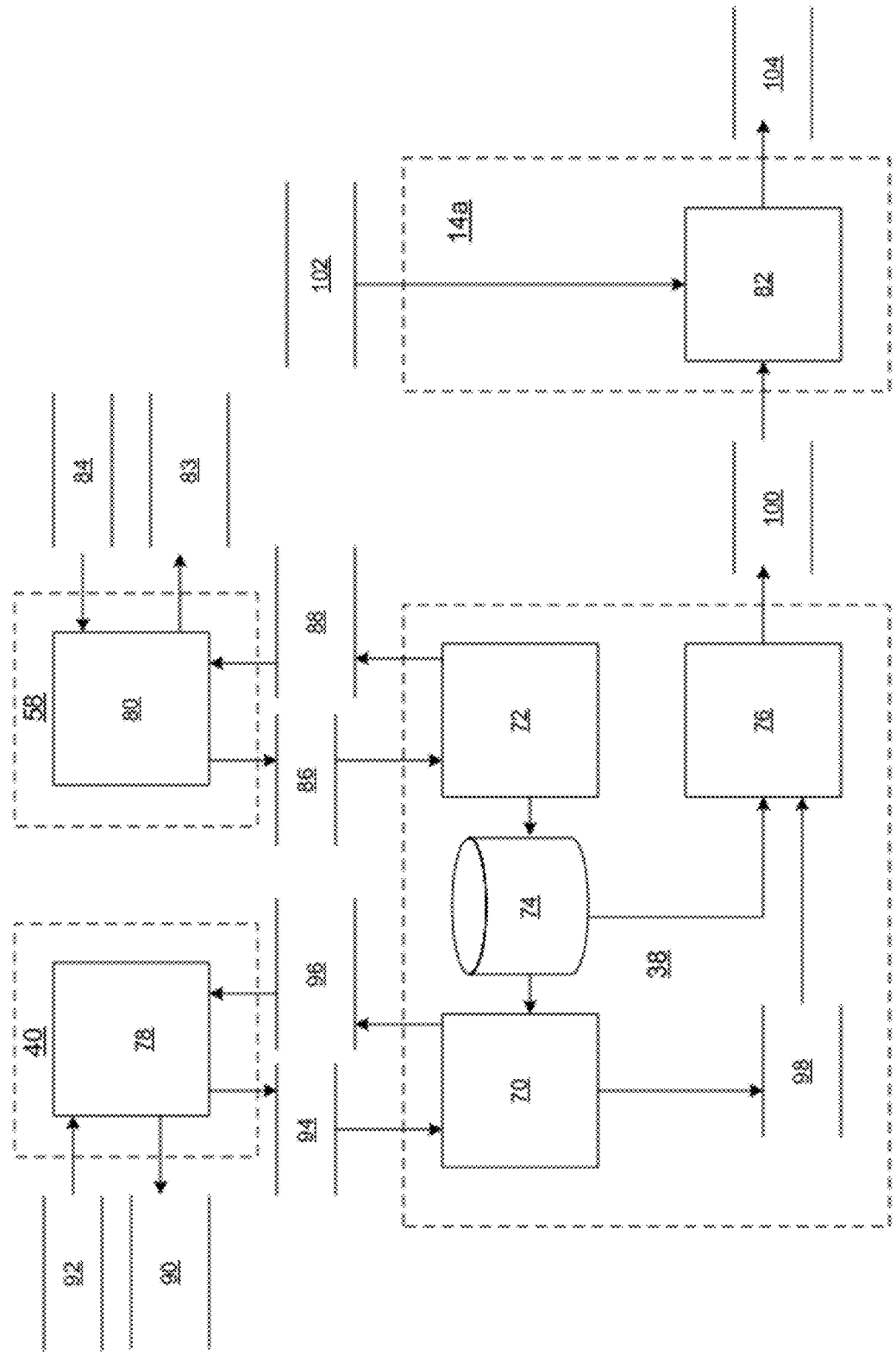
FIG. 2 is a dataflow diagram illustrating activation applications of the activation system in accordance with exemplary embodiments.

Referring now to FIG. 2, a dataflow diagram illustrates various embodiments of the various applications 38, 40, 58 of FIG. 1. As can be appreciated, various embodiments of the applications according to the present disclosure may include any number of modules or sub-modules. For example, the sub-modules shown in FIG. 2 may be combined and/or further partitioned to similarly manage the remote activation of the vehicle network.

In the exemplary embodiments of FIG. 2, the vehicle activation application 38 includes a security authentication module 70, a configuration module 72, a configuration datastore 74, and an activation message module 76. The device activation application 40 includes an activation user interface manager module 78. The configuration application 58 includes a configuration user interface manager module 80. At least one of the control modules and/or devices 14a-14n includes a system activation module 82.

With reference first to the module of the configuration application 58, the configuration user interface manager module 80 generates display data 83 that is used to generate the application interface 60 (FIG. 1). The configuration user interface manager module 80 receives user input 84 that is generated when a user interacts with the application interface 60 (FIG. 1) via the input devices 52 (FIG. 1). Based on the user input 84, the configuration user interface manager module 80 communicates parameters 86 that include security settings such as, for example, a phone number, a security code and/or a password, and control preferences such as, for example, unlock doors, open trunk, turn on interior lights, etc. to the vehicle activation application 38. The configuration user interface manager module 80 receives configuration feedback 88 from the vehicle activation application 38 indicating a status of the configuration. Based on the configuration feedback 88, the configuration user interface manager module 80 updates the display data 83 to indicate the status of the configuration to the user.

With reference now to the module of the device activation application 40, the activation user interface manager module 78 generates display/aural data 90. The display/aural data 90 is used to generate the application interface 42 (FIG. 1) or alternatively, is used to generate voice commands to the user via the speaker 35 (FIG. 1). The activation user interface manager module 78 receives user input 92 that is generated when a user interacts with the application interface 42 (FIG. 1) via the input devices 32 (FIG. 1) and/or the microphone 37 (FIG. 1). Based on the user input 92, the activation user interface manager module 80 communicates messages 94 to the vehicle activation application 38. For example, the messages 94 can include an activation request. The activation request can include security information such as a phone number, a security code, a password, etc. The configuration user interface manager module 78 receives authentication feedback 96 from the vehicle activation application 38 indicating a status of the configuration. Based on the configuration feedback 96, the activation user interface manager module 78 updates the display/aural data 90 to indicate the status of the configuration to the user.

With reference now to the modules of the vehicle activation application 38, the configuration module 72 receives as input the parameters 86. The configuration module 72 stores the security settings and control preferences in the configuration datastore 74 based on the parameters 86.

The security authentication module 70 receives as input the messages 94 initiated by the personal handheld device 24 (FIG. 1). Based on the messages 94, the security authentication module 70 authenticates the personal handheld device 24 (FIG. 1) based on the security settings stored in the configuration datastore 74. For example, the messages 94 can include a phone number (e.g., that is automatically generated by the call) and/or a security code (e.g., that is entered by a user into the handheld device). The phone number and/or security code is compared with the phone number and/or the security code in the configuration datastore 74. The personal handheld device 24 (FIG. 1) is authenticated when the phone numbers and/or the security codes match. In various embodiments, the content of the message 94 can be encrypted by the personal handheld device 24 (FIG. 1) according to a predefined encryption method. The security authentication module 70 authenticates the message 94 based on one or more decryption methods.

The security authentication module 70 generates the authentication feedback 96 based on a status of the authentication. When the personal handheld device is authenticated, the security authentication module 70 generates a secured status 98 that indicates the authentication.

The activation message module 76 receives as input the secured status 98. Based on the secured status 98, the activation message module 76 generates a network activation message 100 on the vehicle network 18 (FIG. 1). For example, when the secured status 98 indicates that the handheld device 24 (FIG. 1) is authenticated, the activation message 100 is generated. As will be discussed in more detail below, the activation message 100 activates one or more control modules and/or devices 14a-14n (FIG. 1) of the vehicle 12 (FIG. 1).

In various embodiments, the activation message module 76 generates the activation message 100 based on the control preferences stored in the configuration datastore 74. For example, when the control preferences indicate to activate one or more particular modules or to perform a particular function, the message includes information indicating which modules to activate and/or what function to perform.

With reference now to the module of the control module 14a, the system activation module 82 receives as input the activation message 100. Based on the activation message 100, the system activation module 82 selectively activates the control module 14a into a control mode and/or activates the associated system 20a (FIG. 1). For example, the system activation module 82 monitors the vehicle network 18 (FIG. 1) for the activation message 100 and when the activation message 100 indicates to activate that particular module or system, one or more methods are performed to "wake-up" that particular control module or system. Once the module or system is activated, the system activation module then selectively generates one or more control signals 104 to control one or more system operations based on a presence signal 102. The presence signal 102 can be generated by the presence indication system 21 (FIG. 1) when the portable device 22 is in proximity to the vehicle 12 (FIG. 1).

In various embodiments, the control module 14a is the body control module and the control signals 104 can perform functions of the vehicle 12 (FIG. 1) such as unlock one or more doors, roll down one or more windows, release a trunk, illuminate a light etc. when the presence signal 102 is received.

Figure 3:
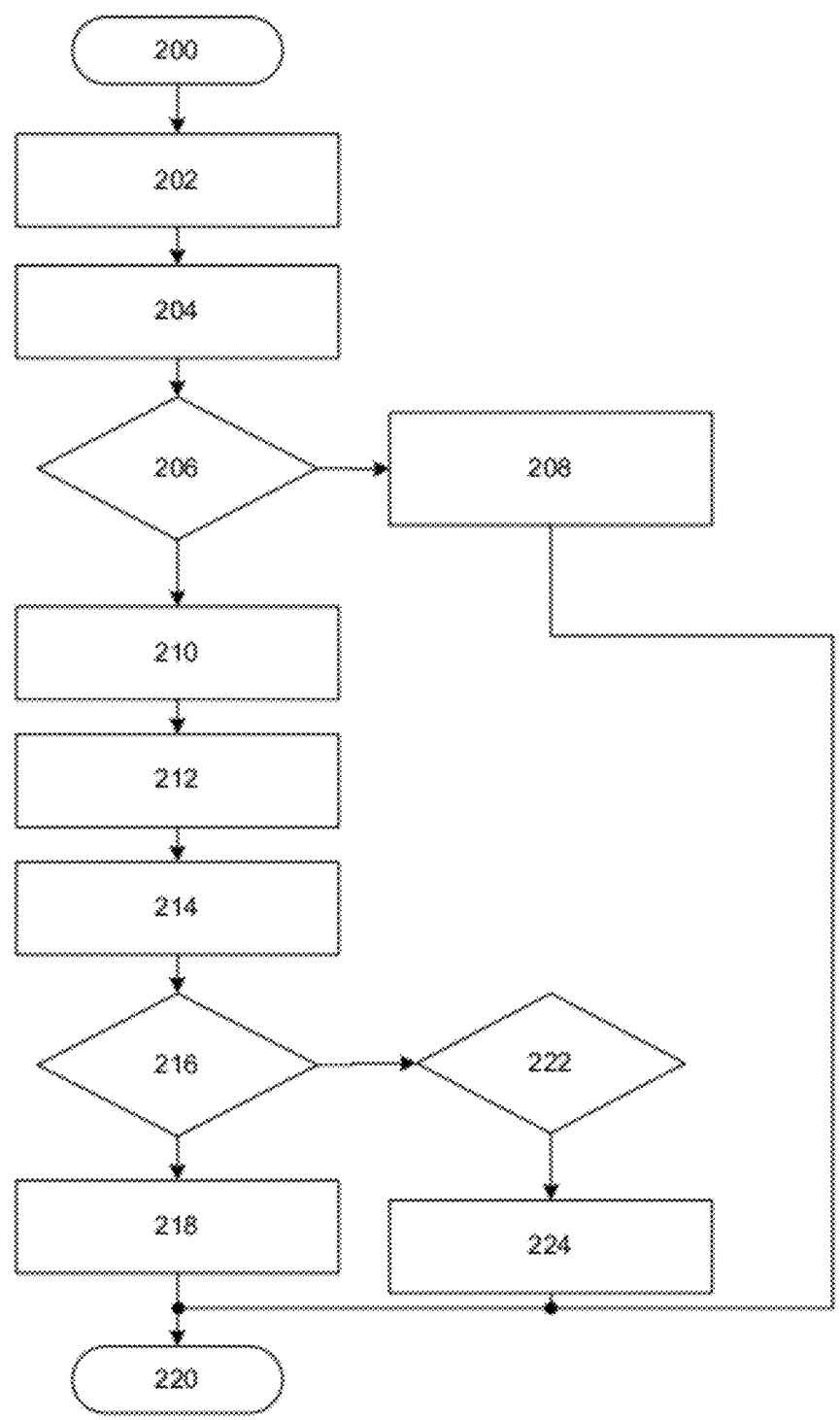
FIG. 3 is a flowchart illustrating an activation method that can be performed by the activation applications in accordance with exemplary embodiments.

Referring now to FIG. 3, and with continued reference to FIG. 2, a flowchart illustrates activation methods that can be performed by the activation system 12 of FIG. 1 in accordance with the present disclosure. As can be appreciated in light of the disclosure, the order of operation within the method is not limited to the sequential execution as illustrated in FIG. 3, but may be performed in one or more varying orders as applicable and in accordance with the present disclosure. As can further be appreciated, one or more steps may be added or removed without altering the spirit of the method.

In one example, the method may begin at 200. Communication with the vehicle activation application 38 is initiated by the device activation application 40 at 202 (e.g., by the personal handheld device 24 (FIG. 1) calling the telematics system 16 (FIG. 1)). The message 94 is received at the vehicle activation application 38 and the personal handheld device 24 (FIG. 1) is authenticated at 204 (e.g., by comparing the security information of the message 94 with the pre-stored security settings).

If the personal handheld device 25 (FIG. 1) is not authenticated at 206, the authentication feedback 96 is generated indicating that the authentication failed at 208. If, however, the personal handheld device 24 (FIG. 1) is authenticated at 206, the activation message 100 is formed based on the control preferences at 210 and the activation message is generated on the vehicle network 18 at 212.

The activation message 100 is received and processed at 214. For example, based on the content of the activation message 100, the control module 14a and/or the system 20a (FIG. 1) is activated (e.g., transitions from a sleep mode to a control mode).

The presence signal 102 is then monitored at 216. If the presence signal 102 is received at 216, the control signals 104 are generated to perform the preferred function at 218. Thereafter, the method may end at 220.

If, however, the presence signal 102 is not received at 216, and the activation time of the control module 14a and/or the system 20a (FIG. 1) is greater than a predetermined threshold at 222, the control module 14a and/or the system 20a (FIG. 1) is deactivated or returned to the sleep mode at 224 and the method may end at 220. If, however, the activation time is less than the predetermined threshold, the presence signal 102 is then monitored at 216.

While the invention has been described with reference to various exemplary embodiments, it will be understood by those skilled in the art that changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A method of communicating with a vehicle, comprising:
   initiating a communication between a vehicle activation application of the vehicle and a personal handheld device while a control module of the vehicle is in a sleep mode, the vehicle including one or more components;
   authenticating, using a processor of the vehicle, the personal handheld device by comparing security information of the communication with security settings of the vehicle in response to the initiating of the communication;
   generating an activation message on the vehicle in response to the personal handheld device being authenticated, the activation massage causing the control module to transition from the sleep mode to a control mode;
   monitoring, by the vehicle, while the control module is in control mode for a presence of the personal handheld device to be in proximity to the vehicle, said monitoring comprising recognizing signals transmitted by the personal handheld device to the system;
   if the presence of the personal handheld device is in proximity to the vehicle, generating a presence signal by the vehicle;
   in response to the generating of the presence signal, selectively activating the one or more components based on user-configurable activation settings; and
   in response to the selectively activating of the one or more components, communicating signals from the vehicle to the personal handheld device that manage an application user interface displayed by a display of the personal handheld device to indicate a status of the one or more components.

2. The method of claim 1, wherein the one or more components includes a control module.

3. The method of claim 1, further comprising selectively generating a control signal based on a presence signal.

4. The method of claim 3, further comprising storing control preferences and wherein the selectively generating the control signal is based on the control preferences.

5. A vehicle comprising:
   a vehicle network that communicates with at least one control module;
   a presence indication system, in communication with the vehicle network, configured to monitor for a presence of a personal handheld device to be in proximity to the vehicle by recognizing signals transmitted by the personal handheld device, and generate a presence signal when the presence of the personal handheld device is in proximity to the vehicle; and
   a telematics system configured to receives messages from the personal handheld device, selectively generates an activation message on the vehicle network to activate the at least one control module from a sleep mode to a control mode based on the existence of the presence signal, monitor for an existence of the presence signal while the at least one control module is in the control mode, and cause a device activation application of the personal handheld device to manage an application user interface displayed by a display of the personal handheld device to indicate a status of the one or more components.

6. The vehicle of claim 5, wherein the telematics system authenticates the personal handheld device based on the messages.

7. The vehicle of claim 6 wherein the messages include security information.

8. The vehicle of claim 6, wherein the security information includes a phone number.

9. The vehicle of claim 7, wherein the security information includes a security code.

10. The vehicle of claim 5, wherein the telematics system selectively generates the activation message based on control preferences.

11. The vehicle of claim 10, wherein the control preferences are preconfigured by a user.

12. The vehicle of claim 11, wherein the at least one control module selectively generates control signals based on the activation message.

13. The vehicle of claim 12, wherein the at least one control module selectively generates the control signals based on the presence signal.

14. The vehicle of claim 10, wherein the at least one control module is a body control module, and wherein the control preferences include at least one of unlock a door, open a trunk, roll down a window, and illuminate a light.

15. The vehicle of claim 5, further comprising a short range wireless communication port configured to provide a direct data link between the portable handheld device and the vehicle network.

16. The vehicle of claim 5, further comprising a vehicle configuration application configured to facilitate user control over the reconfiguring of activation settings of the device activation application.

17. The method of claim 1, further comprising:
if the presence of the personal handheld device is not detected after a predetermined threshold of time, causing the control mode to transition from the control mode to the sleep mode.

18. The vehicle of claim 1, wherein if the presence of the personal handheld device is not detected after a predetermined threshold of time, the telematics system cause the at least one control module to transition from the control mode to the sleep mode.

* * * * *